(12) United States Patent
Ruogu

(10) Patent No.: US 10,185,207 B2
(45) Date of Patent: Jan. 22, 2019

(54) PANORAMIC HEAD

(71) Applicant: Beijing Savoye Image Tech Co., Ltd, Beijing (CN)

(72) Inventor: Zhou Ruogu, Beijing (CN)

(73) Assignee: BEIJING SAVOYE IMAGE TECH CO., LTD, Beijing (CN)

(*) Notice: Subject to any disclaimer, the term of this patent is extended or adjusted under 35 U.S.C. 154(b) by 0 days.

(21) Appl. No.: 15/564,099

(22) PCT Filed: May 26, 2016

(86) PCT No.: PCT/CN2016/083508
§ 371 (c)(1),
(2) Date: Oct. 3, 2017

(87) PCT Pub. No.: WO2016/188452
PCT Pub. Date: Dec. 1, 2016

(65) Prior Publication Data
US 2018/0081259 A1  Mar. 22, 2018

(30) Foreign Application Priority Data

May 26, 2015 (CN) .......................... 2015 1 0275518

(51) Int. Cl.
*G03B 17/56* (2006.01)
*G03B 37/02* (2006.01)
*G03B 37/00* (2006.01)

(52) U.S. Cl.
CPC ........... *G03B 17/561* (2013.01); *G03B 37/00* (2013.01); *G03B 37/02* (2013.01)

(58) Field of Classification Search
None
See application file for complete search history.

(56) References Cited

U.S. PATENT DOCUMENTS 3,286,212 A * 11/1966 Thompson ............. F16M 11/08
248/187.1
5,259,584 A * 11/1993 Wainwright ........... F16M 11/08
248/289.11
(Continued)

FOREIGN PATENT DOCUMENTS

CN       201434960 Y    3/2010
CN       201464781 U    5/2010
(Continued)

OTHER PUBLICATIONS

International Search Report dated Jul. 28, 2016 for International Application No. PCT/CN2016/083508, 8 pages.

*Primary Examiner* — William B Perkey
(74) *Attorney, Agent, or Firm* — Knobbe, Martens, Olson & Bear, LLP

(57) ABSTRACT

A panoramic head includes a base and a rotating main body for bearing a shooting device; a rotating component is arranged at the lower part of the rotating main body, and a fixing part for fixing the shooting device is arranged at the upper part; the base is provided with a matching component for matching the rotating component, the rotating component and the matching component are coaxially arranged, and the rotating component can rotate for 360 degrees relative to the matching component; and the rotating main body is provided with fixing parts conforming to the size of the shooting device, the shooting device is fixed by means of the fixing parts, when the rotating main body rotates along with the rotating component thereof, panoramic shooting can be completed, and a lens node of the shooting device is located on a rotation axis of the rotating component.

13 Claims, 3 Drawing Sheets

(56) References Cited

U.S. PATENT DOCUMENTS

| | | | | |
|---|---|---|---|---|
| 5,752,113 A * | 5/1998 | Borden | ................ | F16M 11/105 |
| | | | | 396/428 |
| 9,377,157 B1 * | 6/2016 | Kilgore | .............. | F16M 11/2064 |
| 2010/0237206 A1 * | 9/2010 | Barker | ................ | F16M 11/041 |
| | | | | 248/206.5 |
| 2012/0033960 A1 * | 2/2012 | Hashimoto | .......... | F16M 11/046 |
| | | | | 396/428 |
| 2015/0365572 A1 * | 12/2015 | Fan | .................... | F16M 11/2007 |
| | | | | 348/36 |

FOREIGN PATENT DOCUMENTS

| | | |
|---|---|---|
| CN | 202166819 U | 3/2012 |
| CN | 202815401 U | 3/2013 |
| CN | 105137706 A | 12/2015 |
| CN | 204883156 U | 12/2015 |
| WO | 2016188452 A1 | 12/2016 |

\* cited by examiner

PANORAMIC HEAD

CROSS REFERENCE TO RELATED APPLICATIONS

This application is the U.S. National Phase Application under 35 U.S.C. § 371 of International Application No. PCT/CN2016/083508, filed May 26, 2016, designating the U.S. and published as WO 2016/188452 on Dec. 1, 2016 which claims the benefit of Chinese Patent Application No. 201510275518.0, filed May 26, 2015, which is hereby incorporated by reference in their entirety.

TECHNICAL FIELD

The present disclosure relates to the field of shooting technology, and particularly to a panoramic head.

BACKGROUND

Typically, panoramic photos are divided into ring panorama and full panorama, and the difference thereof lies in that the ring panorama does not include the place on the top of the head or beneath the foot, while the full panorama includes the panorama in the visual field on the top of the head and even beneath the foot. Due to the existence of a bracket, most underneath visual fields are generated during post production. The vast majority of panoramic photos are spliced by photos in different directions, and the principle that the position of a lens node is unchanged during photo shooting should be abided by. This operation of maintaining the lens node unchanged mainly depends on a panoramic head.

Most existing panoramic heads are universal to a certain extent, and users can select shooting devices within a certain range, thereby having a certain flexibility. However, each user usually uses only one of the shooting devices, therefore such flexibility is not meaningful for ordinary users, but it brings a lot of troubles and problems:

1. The user needs to find out the node of the used lens. The node of the lens is a point on a certain position on a centre shaft of the lens, and the coordinates of the point in the space can represent viewpoint coordinates when the lens is used for shooting. However, the positions of the nodes of different lenses are different and cannot be marked on the lenses. The user needs to determine the position of the node of the lens by a measurement experiment in advance, and in the experimental method, the distance between the lens and a rotating shaft is adjusted, and the relative position relationship between scenes of different distances before and after the adjustment is observed to gradually measure the approximate position of the node of the lens. Due to the experience of a surveyor and other factors, the measurement accuracy may be quite low.

2. When mounting the shooting device, the user needs to align the lens node to the rotating shaft. Most existing panoramic heads have two slide rails and more than two locking devices to adapt to the sizes of different shooting devices, such that the process of only mounting the shooting device during shooting is very troublesome. In addition, these adjustable slide rails and locking devices will bring errors, resulting in that the mounted lens node is not located at a correct position actually, such that the lens node generates displacement during shooting.

3. A combination structure of a rotating shaft and a cantilever generally exists on most existing panoramic heads. This structure is an upward visual angle for keeping the lens node unchanged, the cantilever structure is easy to deform, thereby causing an error, and the deformation will increase over time.

4. The user usually determines the range of the visual field according to the focal length of the used lens and the photo size of the shooting device, and then the number of the photos necessary for synthesizing a panoramic photo is calculated.

5. The existing panoramic head has a larger size and weight, thereby being not convenient to carry. Moreover, it is difficult to dispose in a small plane or space (e.g., on a desktop, inside a car); and because of the complex structure, the manufacturing cost of the existing panoramic head is higher.

In short, the existing panoramic head has the shortcomings of troublesome operation, error proneness, low measurement accuracy, complex structure and high cost.

SUMMARY (1) Technical Problem to be Solved

The purpose of the present disclosure is to provide a panoramic head to solve the shortcomings of tedious operation, error proneness, low measurement accuracy, complex structure and high cost of the existing panoramic head.

(2) Technical Solution

To solve the aforementioned technical problem, the present disclosure provides a panoramic head, including a base and a rotating main body for bearing a shooting device; a rotating component is arranged at the lower part of the rotating main body, a fixing part for fixing the shooting device is arranged at the upper part, the base is provided with a matching component for matching the rotating component, and the rotating component and the matching component are coaxially arranged; and when the shooting device is placed on the fixing part, a lens node of the shooting device is located on a rotation axis of the rotating component.

The shooting device is a camera or a mobile phone having a shooting function, the fixing part is a ring shot holding component, the shooting device is placed in the ring shot holding component, a lens of the shooting device stretches to the rotation axis of the rotating component, and the lens node is located on the rotation axis of the rotating component.

A top shot holding component is formed in the top of the ring shot holding component, and when the camera lies in the top shot holding component, the position of the lens node is the same as the position of the lens node when the camera is placed in the ring shot holding component.

The rotating component is a rotating ring, the matching component is a matching column protruding from the base, and the rotating ring is inserted onto the matching column.

The rotating component is a rotating column, the matching component is a matching ring protruding from the base, and the rotating column is inserted onto the matching ring.

A plurality of ring shot positioning marks are sequentially arranged in the circumferential direction of the rotating ring, a reference mark is arranged on the base, and when the rotating ring rotates, the plurality of ring shot positioning marks respectively correspond to the reference mark.

A gradienter is arranged on the base.

A screw hole is formed in the bottom of the base for connecting with a shooting bracket.

The rotating ring is in the shape of a regular polygon, the matching component is a matching column that matches the rotating ring and protrudes from the base, and the rotating ring is inserted onto the matching column.

A magnet is built in the base.

(3) Beneficial Effects

The aforementioned technical solutions of the present disclosure have the following advantages: in the panoramic head provided by the present disclosure, the rotating component and the matching component match with each other and are coaxially arranged, the rotating component can rotate for 360 degrees relative to the matching component, since the rotating main body is provided with the fixing part conforming to the size of the shooting device, the shooting device is fixed by the fixing part, thereby being mounted quickly and conveniently, when the rotating main body rotates along with the rotating component thereof, panoramic shooting can be completed, so that the operation is simple, the lens node of the shooting device is located on the rotation axis of the rotating component, so that the shooting device is unlikely to generate an error and the shooting precision is high, and moreover, the panoramic head provided by the present disclosure is simple in structure and low in manufacturing cost.

REFERENCE SIGNS

1: rotating main body; 2: base; 3: rotation axis; 4: ring shot holding component; 5: top shot holding component; 6: rotating ring; 7: ring shot positioning mark; 8: matching column; 9: reference mark; 10: gradienter; and 11: camera.

DETAILED DESCRIPTION

Specific implementations of the present disclosure will be further described below in detail in combination with the accompanying drawings and embodiments. The following embodiments are used for illustrating the present disclosure rather than limiting the scope of the present disclosure.

Figure 1:
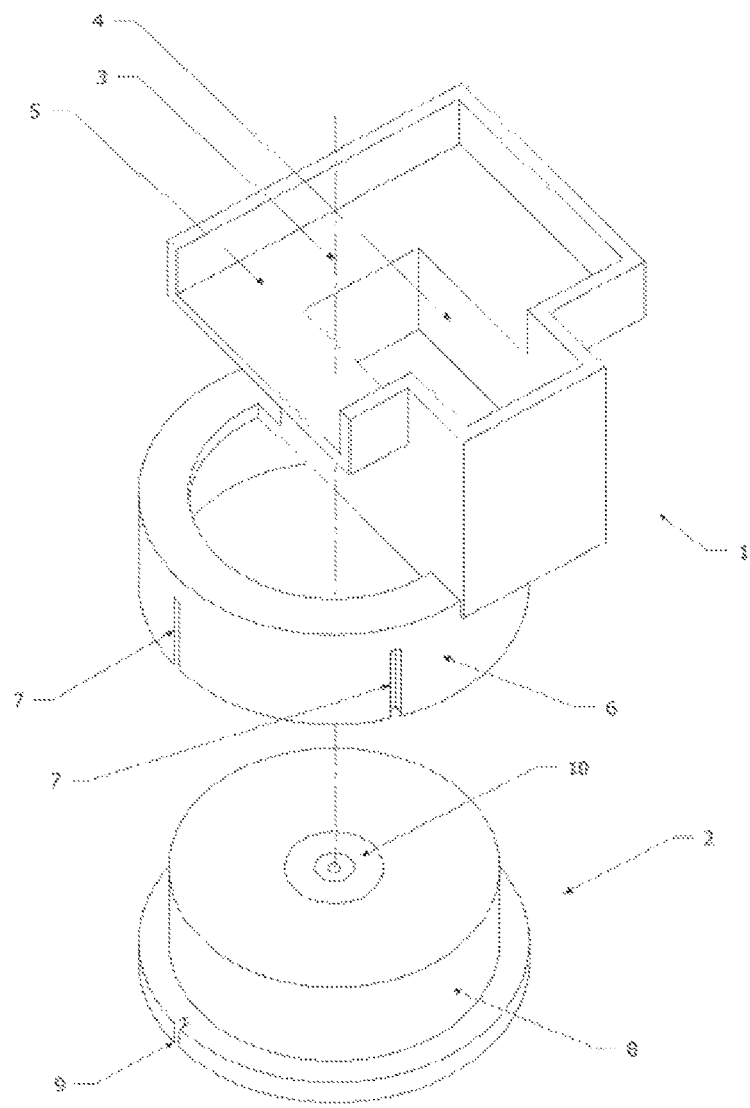
FIG. 1 is a three-dimensional assembly diagram of a panoramic head provided by an embodiment of the present disclosure.
Figure 2:
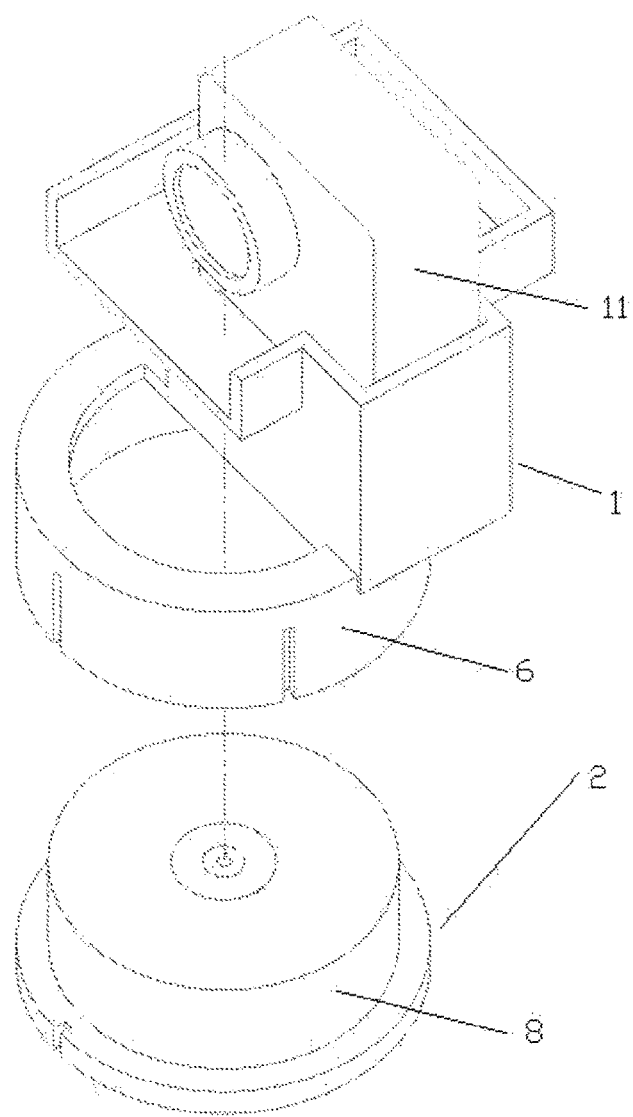
FIG. 2 is a structural schematic diagram of a camera placed in a ring shot holding component of a panoramic head provided by an embodiment of the present disclosure.
Figure 3:
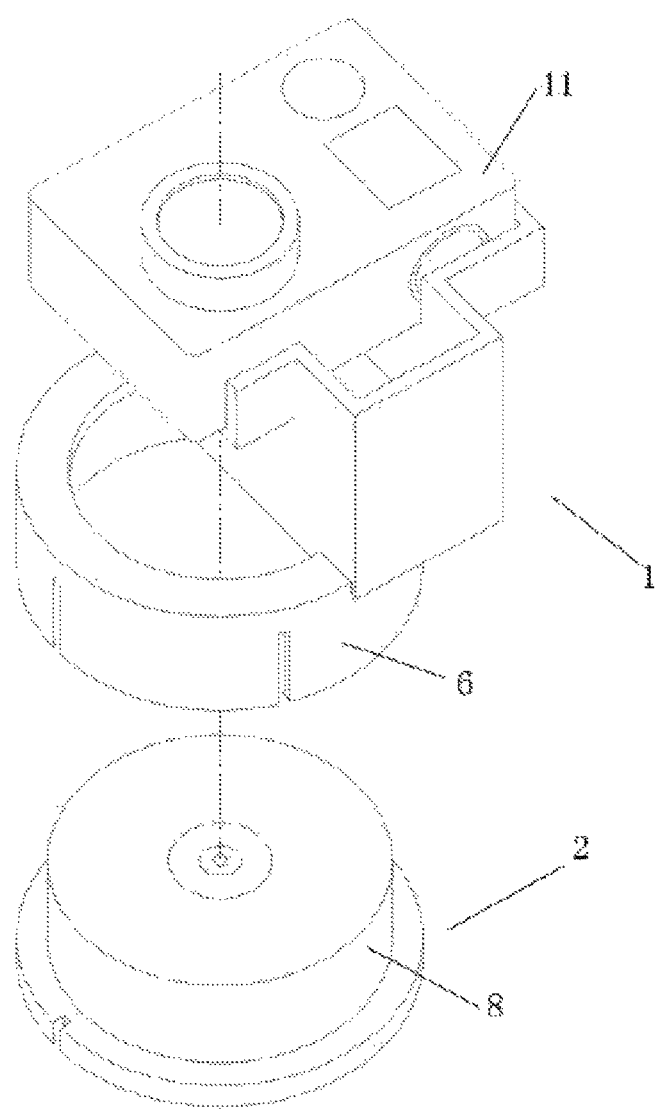
FIG. 3 is a structural schematic diagram of a camera placed in a top shot holding component of a panoramic head provided by an embodiment of the present disclosure.

As shown in FIG. 1, FIG. 2 and FIG. 3, the panoramic head provided by the present disclosure includes a base 2 and a rotating main body 1 for bearing a shooting device; a rotating component, specifically a rotating ring 6, is arranged at the lower part of the rotating main body 1, a fixing part for fixing the shooting device is arranged at the upper part, the base 2 is provided with a matching component for matching the rotating component, which is specifically a protruding matching column 8, the rotating ring 6 is inserted onto the matching column 8, and the rotating component and the matching component are coaxially arranged; and when the camera device is placed on the fixing part, a lens node of the shooting device is located on a rotation axis 3 of the rotating component.

In the aforementioned embodiment, the rotating component and the matching component match with each other and are coaxially arranged, the rotating component can rotate for 360 degrees relative to the matching component. Since the rotating main body 1 is provided with the fixing part conforming to the size of the shooting device, the shooting device is fixed by the fixing part, and the lens node of the shooting device is located on the rotation axis 3 of the rotating component, so that when the rotating main body 1 rotates along with the rotating component thereof, panoramic shooting can be completed.

Specifically, the shooting device is a camera 11, the fixing part is a ring shot holding component 4, the ring shot holding component 4 is located on one side of the rotation axis 3 of the rotating component, the camera 11 is placed in the ring shot holding component 4, a lens of the camera 11 stretches to the rotation axis 3 of the rotating component, and the lens node is just located on the rotation axis 3 of the rotating component. After the camera 11 is inserted into a slot, the installation is completed, due to the position design of the ring shot holding component 4, the lens node of the camera 11 is just located on the rotating shaft of the rotating part of the rotating main body 1, the rotating main body 1 rotates, and the shooting of ring panorama is completed.

Similarly, the shooting device can also be a mobile phone having a shooting function or other electronic devices having shooting functions, the mobile phone or the electronic device is placed in the ring shot holding component 4, the lens of the mobile phone or the electronic device stretches to the rotation axis 3 of the rotating component, and the lens node is just located on the rotation axis 3 of the rotating component. After the mobile phone or the electronic device is inserted into the slot, the installation is completed, due to the position design of the ring shot holding component 4, the lens node of the mobile phone or the electronic device is just located on the rotating shaft of the rotating part of the rotating main body 1, the rotating main body 1 rotates, and the shooting of ring panorama is completed.

Preferably, a top shot holding component 5 is formed on the top of the ring shot holding component 4, and when the camera 11 lies in the top shot holding component 5, the position of the lens node is the same as the position of the lens node when the camera 11 is placed in the ring shot holding component 4. An upward shooting position platform, i.e., the top shot holding component 5, is arranged at the top. When the top view field needs to be enlarged, the camera 11 is placed on the platform, the lens node is still located at the same position as the lens node when the camera 11 is located in the ring shot holding component 4, and just one more photo is shot.

Generally, the rotating component is the rotating ring 6, the matching component is the matching column 8 protruding from the base 2, the rotating ring 6 is inserted onto the matching column 8, the rotating ring 6 can be a circular ring and can also be a ring in the shape of a regular polygon, which is similar to a benzene ring structure; and of course, the matching structure of the rotating component and the matching component is not limited to the aforementioned structure, for example, the rotating component can be a rotating column, the matching component is a matching ring protruding from the base 2, and the rotating column is inserted onto the matching ring, as long as stable and reliable relative rotation of the rotating component and the matching component can be realized.

Preferably, a plurality of ring shot positioning marks 7 are sequentially arranged in the circumferential direction of the rotating ring 6, a reference mark 9 is arranged on the base 2, and when the rotating ring 6 rotates, the plurality of ring shot positioning marks 7 respectively correspond to the reference mark 9. The rotating ring 6 is rotated to sequentially align the several marks thereon to the reference mark 9 on the base 2 for shooting, and then the shooting of ring panorama is completed; and according to the visual field of a certain camera 11, corresponding to the product with a corresponding model, the ring shot positioning marks 7 are arranged.

Preferably, a gradienter 10 is arranged at the axial line of the matching column 8, for example, a bubble type gradienter 10, for shooting a horizontal position of the head before shooting; and a screw hole is formed in the bottom of the base 2 for connecting with a shooting bracket through bolts.

Preferably, a magnet is built in the base, so that when a supporting platform is made of iron, the panoramic head provided by the present disclosure can be adsorbed and fixed.

When the panoramic head provided by the present disclosure is used, the base 2 is fixed on a tripod (or a bracket having standard screws) by a standard screw hole, and the tripod (or the bracket) is adjusted to a horizontal position according to the bubble type gradienter 10 on the base 2; the rotating main body 1 is inserted into the base 2; the shooting device is vertically (or transversely, according to different product designs) inserted into the ring shot holding component 4; the positioning mark of the rotating ring 6 is aligned to the positioning reference mark 9 on the base 2, and the shooting device is adopted to shoot a first photo; the remaining marks are sequentially aligned along the same direction (clockwise or counterclockwise), and a photo is shot at each position; so far, all the photos necessary for making 360° ring panorama have been acquired; if full panorama having a top face needs to be made, only one more step is carried out; and the shooting device is taken out from the ring shot holding component 4, is placed in the top shot holding component 5 according to a correct direction and is adopted to shoot an overhead photo, and then the operation is completed.

The panoramic head provided by the present disclosure can be used on GoPro, Mi Yi and other shooting devices.

The technical effects of invention points of the present disclosure are as follows:

due to the slot type designs of the ring shot holding component 4 and the top shot holding component 5, two improvements are realized: the mounting and dismounting speed is greatly improved, the user can ensure a correct position of the lens node without any calculation, no slide rail or locking device is needed, and thus the errors are avoided.

The top position platform is provided by the top shot holding component 5, so that the shooting device can be switched to a correct upward shooting position simply and quickly without using a cantilever structure, and thus the errors are avoided.

Since the plurality of ring shot positioning marks 7 are sequentially arranged in the circumferential direction of the rotating ring 6 and the reference mark 9 is arranged on the base 2, positioning during rotation can be carried out conveniently, clearly and exactly, and the operation is convenient.

The overall technical effects of the present disclosure are as follows:

before the shooting: in the past, the user needs to prepare more before shooting, for example, measuring the lens node, calculating the shooting number, while in the panoramic head provided by the present disclosure, since the position of the ring shot holding component 4 can be designed in advance, the lens node is located on the rotation axis 3, and the positioning marks are arranged, so the aforementioned steps are not necessary at all in use, and thus the operation is simple.

Shooting scene: for shooting a panorama in the past, more steps are needed from device installation to shooting, so the time is longer. The steps in the present disclosure are simple, the shooting speed can be improved in folds, and meanwhile, links prone to errors are greatly compressed; and meanwhile, the present disclosure has a simple and smart structure, and thus can be easily disposed in a small plane or space (e.g., on a desktop, inside a car and inside other smaller planes or spaces where other devices cannot be disposed).

With respect to the manufacturing precision, since the present disclosure has a simple structure, high precision is easy to realize; and with respect to the manufacturing cost and environmental protection, since the present disclosure has a small size, a light weight and a simple structure, materials can be obviously saved, and process links are greatly simplified, so that the manufacturing cost is several tenths and even hundredth of that of the existing panoramic head products, and thus it is easier to achieve environmental protection.

The foregoing descriptions are merely preferred embodiments of the present disclosure, it should be noted that those of ordinary skill in the art can still make various improvements and variations without departing from the technical principle of the present disclosure, and these improvements and variations should also fall within the protection scope of the present disclosure.

INDUSTRIAL APPLICABILITY

The present disclosure provides a panoramic head, including a base and a rotating main body for bearing a shooting device; a rotating component is arranged at the lower part of the rotating main body, a fixing part for fixing the shooting device is arranged at the upper part, the base is provided with a matching component for matching the rotating component, and the rotating component and the matching component are coaxially arranged; and when the shooting device is placed on the fixing part, a lens node of the shooting device is located on a rotation axis of the rotating component. According to the present disclosure, the rotating component and the matching component match with each other and are coaxially arranged, the rotating component can rotate for 360 degrees relative to the matching component, since the rotating main body is provided with the fixing part conforming to the size of the shooting device, the shooting device is fixed by the fixing part, thereby being mounted quickly and conveniently. When the rotating main body rotates along with the rotating component thereof, panoramic shooting can be completed, so that the operation is simple, the lens node of the shooting device is located on the rotation axis of the rotating component, so that the shooting device is unlikely to generate errors and the shooting precision is high, and moreover, the panoramic head provided by the present disclosure is simple in structure, low in manufacturing cost and stronger in practicability.

What is claimed is:
1. A panoramic head, comprising:
a base and a rotating main body configured to bear a shooting device; and a rotating component disposed at a lower part of the rotating main body, a fixing part configured to fix the shooting device disposed on an upper part of the rotating component, the base including a matching component for matching the rotating component, the rotating component and the matching component coaxially arranged; and when the shooting device is disposed on the fixing part, a lens node of the shooting device disposed on a rotation axis of the rotating component, wherein the shooting device includes a camera or a mobile phone including a shooting function, the fixing part includes a ring shot holding component, the shooting device configured to be placed in the ring shot holding component, a lens of the shooting device is configured to stretch to the rotation axis of the rotating component, and the lens node is disposed on the rotation axis of the rotating component, wherein a top shot holding component is disposed on a top portion of the ring shot holding component, and when the camera lies in the top shot holding component, the position of the lens node is the same as the position of the lens node when the camera is placed in the ring shot holding component.

2. The panoramic head of claim 1, wherein the rotating component includes a rotating ring, the matching component includes a matching column protruding from the base, and the rotating ring is inserted onto the matching ring.

3. The panoramic head of claim 1, wherein the rotating component includes a rotating column, the matching component includes a matching ring protruding from the base, and the rotating column is inserted onto the matching column.

4. The panoramic head of claim 2, wherein a plurality of ring shot positioning marks are sequentially disposed in a circumferential direction of the rotating ring, a reference mark is disposed on the base, and in response to the rotating ring rotating, the plurality of ring shot positioning marks respectively correspond to the reference mark.

5. The panoramic head of claim 2, wherein a gradienter is disposed on the base.

6. The panoramic head of claim 1, wherein a screw hole is disposed in a bottom portion of the base, the screw hole configured to connect with a shooting bracket.

7. The panoramic head of claim 2, wherein the rotating ring is in a shape of a regular polygon, the matching component includes a matching column that matches the rotating ring and protrudes from the base, and the rotating ring is inserted onto the matching column.

8. The panoramic head of claim 1, wherein a magnet is disposed in the base.

9. A panoramic head, comprising:
a base and a rotating main body configured to bear a shooting device; and
a rotating component disposed at a lower part of the rotating main body, a fixing part configured to fix the shooting device disposed on an upper part of the rotating component, the base including a matching component for matching the rotating component, the rotating component and the matching component coaxially arranged; and when the shooting device is disposed on the fixing part, a lens node of the shooting device disposed on a rotation axis of the rotating component, wherein the shooting device includes a camera or a mobile phone including a shooting function, the fixing part includes a ring shot holding component, the shooting device configured to be placed in the ring shot holding component, a lens of the shooting device is configured to stretch to the rotation axis of the rotating component, and the lens node is disposed on the rotation axis of the rotating component, wherein the rotating component includes a rotating ring, the matching component includes a matching column protruding from the base, and the rotating ring is inserted onto the matching column.

10. The panoramic head of claim 9, wherein a plurality of ring shot positioning marks are sequentially disposed in a circumferential direction of the rotating ring, a reference mark is disposed on the base, and in response to the rotating ring rotating, the plurality of ring shot positioning marks respectively correspond to the reference mark.

11. The panoramic head of claim 9, wherein a gradienter is disposed on the base.

12. The panoramic head of claim 9, wherein the rotating ring is in a shape of a regular polygon, the matching component includes a matching column that matches the rotating ring and protrudes from the base, and the rotating ring is inserted onto the matching column.

13. A panoramic head, comprising:
a base and a rotating main body configured to bear a shooting device; and
a rotating component disposed at a lower part of the rotating main body, a fixing part configured to fix the shooting device disposed on an upper part of the rotating component, the base including a matching component for matching the rotating component, the rotating component and the matching component coaxially arranged; and when the shooting device is disposed on the fixing part, a lens node of the shooting device disposed on a rotation axis of the rotating component, wherein the shooting device includes a camera or a mobile phone including a shooting function, the fixing part includes a ring shot holding component, the shooting device configured to be placed in the ring shot holding component, a lens of the shooting device is configured to stretch to the rotation axis of the rotating component, and the lens node is disposed on the rotation axis of the rotating component, wherein the rotating component includes a rotating column, the matching component includes a matching ring protruding from the base, and the rotating column is inserted onto the matching ring.

* * * * *